United States Patent [19]

Frantz

[11] Patent Number: 5,218,682
[45] Date of Patent: Jun. 8, 1993

[54] TWO-WAY HANDSHAKE CIRCUIT AND METHOD FOR COMMUNICATION BETWEEN PROCESSORS

[75] Inventor: Douglas C. Frantz, Lake Orion, Mich.

[73] Assignee: Chrysler Corporation, Highland Park, Mich.

[21] Appl. No.: 698,529

[22] Filed: May 10, 1991

[51] Int. Cl.⁵ .............................................. G06F 13/42
[52] U.S. Cl. .............................. 395/325; 364/DIG. 2; 364/940.81; 364/927.95
[58] Field of Search .................. 364/DIG. 1, DIG. 2; 395/200, 325

[56] References Cited

U.S. PATENT DOCUMENTS

| | | | |
|---|---|---|---|
| 4,209,840 | 6/1980 | Berardi et al. | 364/DIG. 1 |
| 4,428,046 | 1/1984 | Chari et al. | 395/325 |
| 4,612,638 | 9/1986 | Kissel | |
| 4,695,944 | 9/1987 | Zandveld et al. | 395/325 |
| 4,739,323 | 4/1988 | Miesterfeld et al. | |
| 4,829,467 | 5/1989 | Ogata | 364/DIG. 2 |
| 4,852,043 | 7/1989 | Guest | 395/325 |

Primary Examiner—Thomas M. Heckler
Attorney, Agent, or Firm—Mark P. Calcaterra

[57] ABSTRACT

A two-way handshake circuit and method for communications between digital devices, such as microprocessors which employs one tri-state input/output port pin per microprocessor or digital device. The configuration of each tri-state input/output port pin is controlled by control software within the digital device. The tri-state input/output port pins are connected by a self-latching circuit employing two parallel branches. A first branch includes a first amplifier or inverter connected in series with a first resistor so as to allow voltage level changes to be reflected in only one direction. A second branch includes a second amplifier or inverter connected in series with a second resistor so as to allow voltage level changes to be reflected in the opposite direction of the first branch.

7 Claims, 2 Drawing Sheets

TWO-WAY HANDSHAKE CIRCUIT AND METHOD FOR COMMUNICATION BETWEEN PROCESSORS

BACKGROUND OF THE INVENTION

1. Technical Field

The present invention relates to digital communication and more specifically to a two-way handshake circuit and method for communication between processors.

2. Discussion

In a digital circuit, digital port pins are capable of transmitting or receiving digital data but not both. Digital data port pins typically react to changes in voltage or produce changes in voltage. There are only two voltage states in a digital system, a high voltage level or a low voltage level. In such a circuit, a high voltage state has a certain meaning, and the low voltage state has a different meaning. Transferring long strings of high or low voltage pulses between digital circuits and components produces digital messages which are used by devices such as personal computers to do useful work.

In many computer applications, it is necessary for two or more digital devices, such as microprocessors, to communicate with each other. Typically, communication is accomplished by sending data from one microprocessor to another via a set of data communication lines called a bus. For accurate communication, a method of regulating how microprocessors exchange data on these bus lines called handshaking is used. Handshaking between microprocessors is simply defined as one microprocessor telling another microprocessor that it has received a data message and is ready for the next message. Two-way handshaking is defined as a method of bidirectionally regulating data transfer between microprocessors.

Typically, handshaking has been carried out using two or more control lines linking the microprocessors. The control lines are used by the linked microprocessors to regulate the transmission of the data. The control lines regulate data transmission by signaling one microprocessor that the other is ready to receive data. The control lines also tell the receiving microprocessor when the data has been transmitted to the bus and is valid or ready to be received. The two-way handshaking sequence is completed when the data is accepted by the receiving microprocessor and the control lines signal that the other microprocessor is ready to receive data again.

Many two-way handshake circuits utilize tri-state or three-state input/output ports as control lines to coordinate communication between microprocessors. An overview of tri-state input/output ports and their application is presented in U.S. Pat. No. 4,612,638 to Kissel and is hereby expressly and specifically incorporated by reference. Tri-state input/output port pins differ from conventional digital port pins in that the former can be configured as an input or an output at any particular time as determined by a microprocessor program control. This characteristic makes the tri-state input/output port an extremely versatile type of digital port.

When the tri-state input/output port pin is configured as an input, it is at a high impedance and the voltage state applied to the pin is capable of being measured by the microprocessor. When configured as an output, the tri-state port pin is at a low impedance, and its output voltage level is determined by the microprocessor. Tri-state input/output ports are symbolically represented as two superimposed amplifier symbols. One symbol represents the tri-state port's ability to act as an input. The other symbol represents the port's ability to act as an output.

Previous handshake circuits utilize two tri-state input/output control lines per microprocessor to facilitate handshaking. This technique, however, reduces efficient use of the microprocessor's tri-state input/output ports. Additionally, chip selection is limited to the more expensive chips, each containing at least two tri-state control lines.

SUMMARY OF THE INVENTION

An object of the present invention is to provide a handshake circuit and method employing only one tri-state input/output port pin per microprocessor or other digital device.

In accordance with the teachings of the present invention, a handshake circuit for coordinating exchange of data messages between first and second data processors, each having memory and control software, includes a first input/output port within the first data processor for receiving and transmitting signals, the control software associated with the first data processor configuring the first input/output port in one of a signal receiving mode and a signal transmitting mode. A second input/output port is provided within the second data processor for receiving or transmitting signals, the control software associated with the second data processor configuring the second input/output port in one of a signal receiving mode and a signal transmitting mode, and a self-latching circuit connecting the first and second input/output ports for storing signals transmitted between the first and second input/output ports.

The invention also contemplates a method for coordinating exchange of data between first and second processors each having memory and control software and interconnected via a data bus. The method includes the steps of providing a first tri-state input/output port at the first processor, a second tri-state input/output port at the second processor and a self-latching handshake circuit interconnecting the first and second input/output ports; initializing both processors, via their respective control software, to place their respective tri-state input/output ports in a high impedance state enabling either processor to monitor a signal latched to the handshake circuit; causing either one of the processors, via its respective control software, to set its respective input/output port to a low impedance level for outputting a handshake signal of a first logic level onto the handshake circuit whenever the one processor is ready to receive data on the data bus and thereafter returning the respective input/output port to a high impedance level; and causing either one of the processors, via its respective control software, to set its respective input/output port to a low impedance level for outputting a handshake signal of a second logic level onto the handshake circuit whenever the one processor is not ready to receive data on the data bus and thereafter returning the respective input/output port to a high impedance level.

BRIEF DESCRIPTION OF THE DRAWINGS

Additional benefits and advantages of the present invention will become apparent upon reading the following detailed description and upon reference to the following drawings:

FIG. 5 is a flowchart illustrating a method of two-way handshaking in accordance with the present invention.

DETAILED DESCRIPTION OF THE PREFERRED EMBODIMENT

Figure 1:
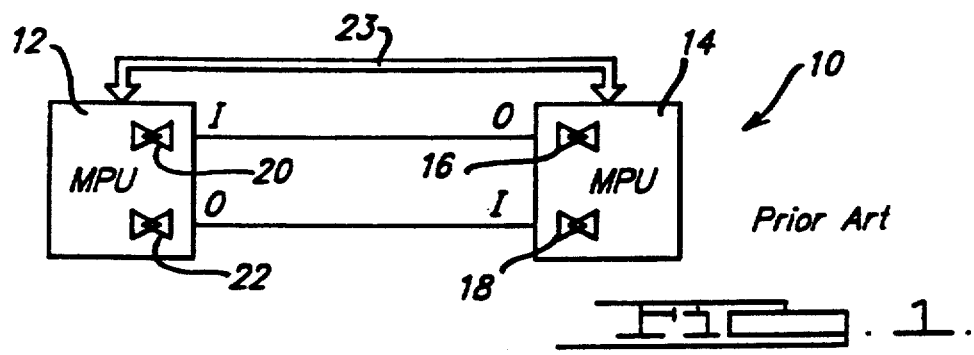
FIG. 1 is schematic representation of a prior art two-way handshake circuit which utilizes two tri-state input/output port pins per microprocessor.

Referring to FIG. 1, a typical prior art two-way handshake circuit 10 utilizing tri-state input/output ports as handshaking control lines is shown. Microprocessors 12 and 14 are interconnected for data communication over bus 23, and are each equipped with at least two tri-state input/output port pins. The tri-state port pins utilized for handshaking are shown as pins 16 and 18 of microprocessor 14 and pins 20 and 22 of microprocessor 12. In each microprocessor, one tri-state port pin is always configured as an input. The other tri-state port pin is always configured as an output. For example, in this circuit, tri-state port pins 18 and 20 would always be configured as inputs while pins 16 and 22 would be configured as outputs. Data bus 23 may be arranged for either serial or parallel data transmission.

Figure 2:
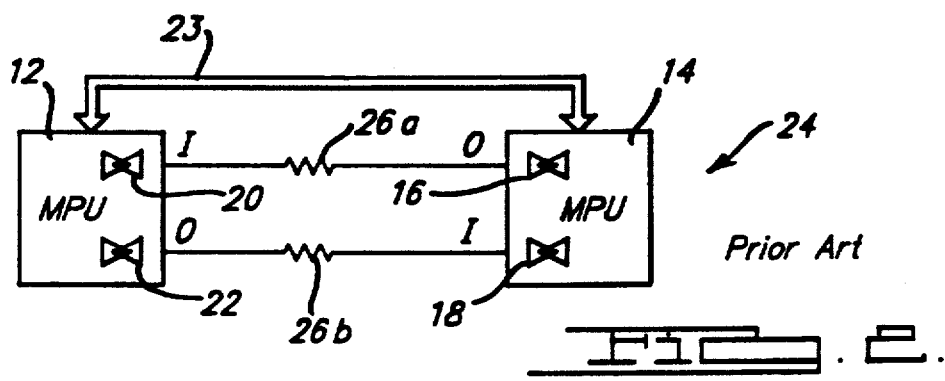
FIG. 2 is a schematic representation of a prior art second two-way handshake circuit which utilizes two tri-state input/output port pins per microprocessor and which uses isolating resistors on each control line.

Referring to FIG. 2, a second prior art two-way handshaking circuit 24 utilizes tri-state input/output ports as handshaking control lines. This handshaking circuit differs from the circuit in FIG. 1 only with respect to the addition of isolating resistors 26a and 26b. These resistors function to provide a load which is necessary to protect the output configured tri-state ports 16 and 22 during low impedance operation.

Operation of handshake circuits 10 and 24 depicted in FIGS. 1 and 2 is relatively simple. When microprocessor 14 has data to send on bus 23, it informs microprocessor 12 by sending a signal from the tri-state port pin 16 to the input configured tri-state port 20. Once microprocessor 12 picks up the data from bus 23, it notifies microprocessor 14 by sending a signal from its tri-state port pin 22 to tri-state port pin 18. If data is to be sent on bus 23 from microprocessor 12 to microprocessor 14, a signal is outputted by tri-state port pin 22 and received by tri-state port pin 18. Finally, microprocessor 14 sends a signal from tri-state port 16 to tri-state port 20 signifying that it has finished receiving data over bus 23.

Figure 3:
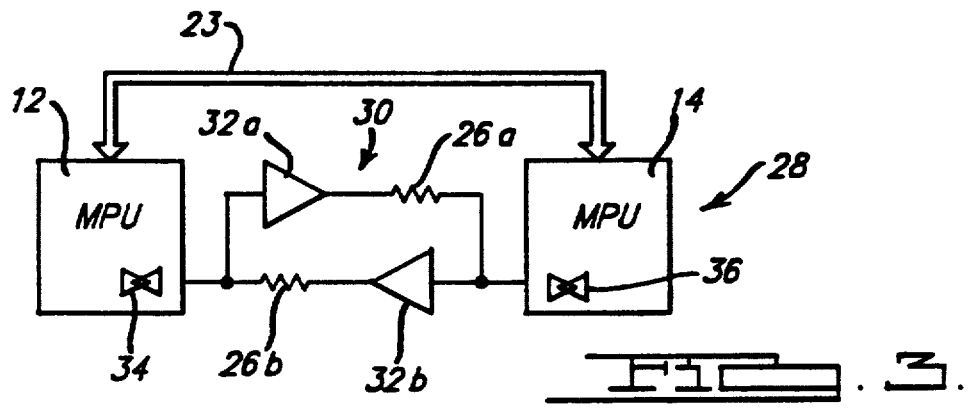
FIG. 3 is a schematic representation of a two-way handshake circuit arranged in accordance with the present invention.
Figure 4:
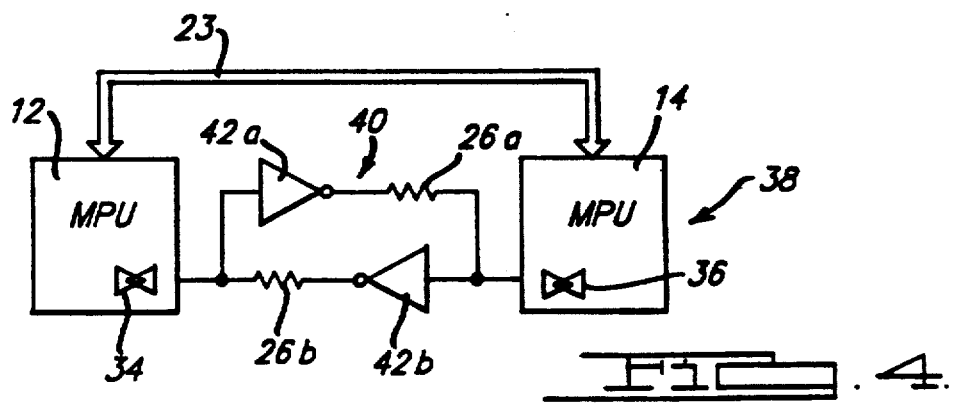
FIG. 4 is a schematic of a second embodiment of a two-way handshake circuit arranged in accordance with the present invention.
Figure 3:
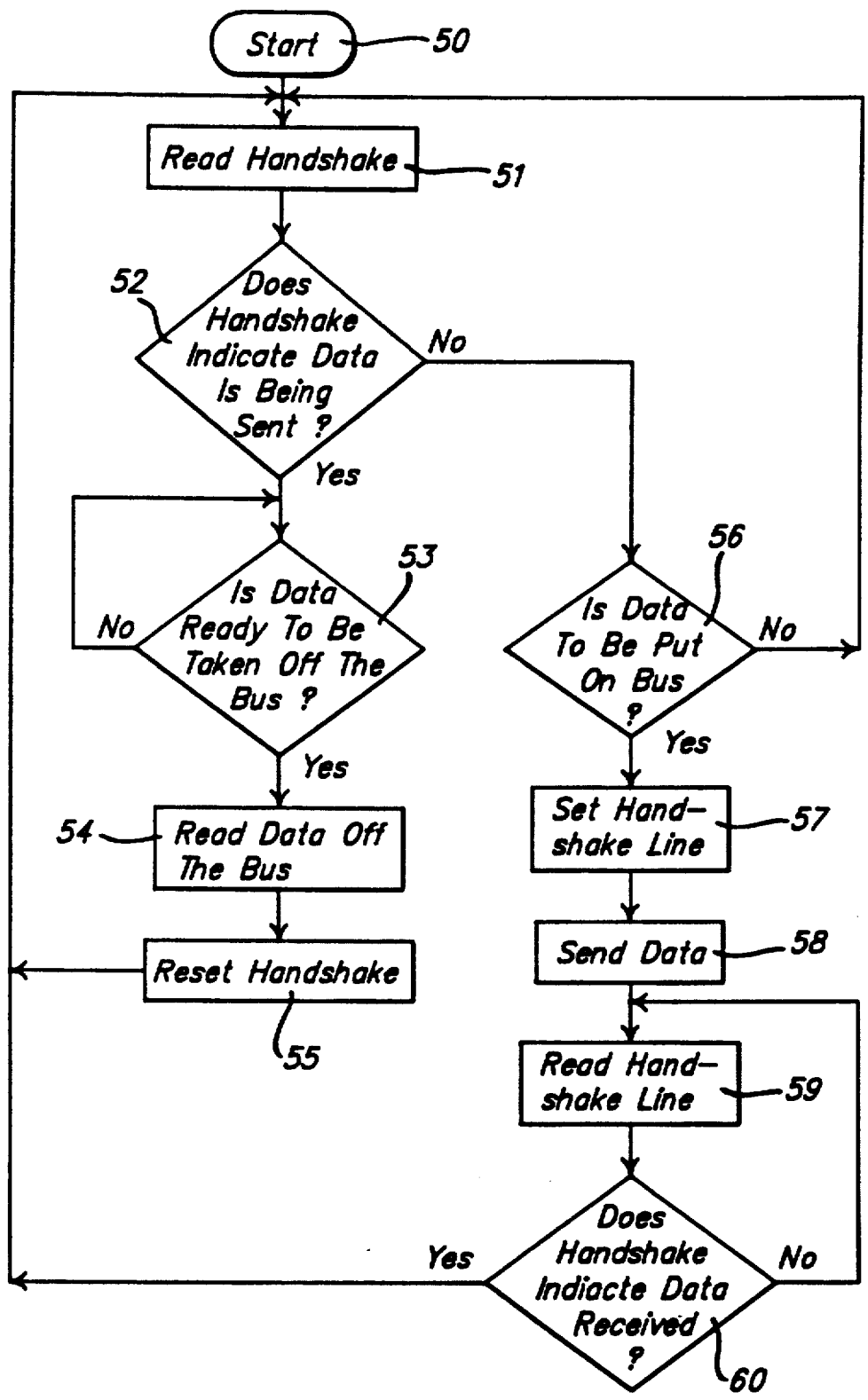

Turning now to FIGS. 3 and 4 there are shown preferred embodiments 28 and 38 of the present invention designed to facilitate two-way handshaking between two digital devices such as microprocessors 12 and 14 which are interconnected for data communication via bus 23. An example of a microprocessor containing tri-state port pins is the Motorola 6801 which has three tri-state ports when configured in the single chip mode. The handshaking circuits include a tri-state input/output port pin on each microprocessor interconnected by a self-latching circuit. Depending upon microprocessor control, each tri-state port pin can be configured either as an input or an output. The latching circuit is designed to accept an input from either microprocessor's tri-state port, holding and reflecting the last inputted voltage value when both ports 34 and 36 are in the high impedance state, or input mode.

Referring to FIG. 3, an embodiment 28 is shown where the self-latching circuit 30 is produced using buffer amplifiers 32a and 32b. The two-isolating resistors 26a and 26b provide a load which protects the tri-state ports 34 and 36 during low impedance, or output mode, operation.

The embodiment 38 shown in FIG. 4 utilizes a self-latching circuit 40 employing inverters 42a and 42b. Isolating resistors 26a and 26b are also included for tri-state port protection during low impedance operation.

A method for implementing a handshake routine between microprocessors 12 and 14 of FIGS. 3 and 4 typically could be implemented in the form of software which directly controls microprocessor operation. This software, commonly referred to as a control program, could be contained within the digital device itself, either burnt into the microprocessor when configured in single chip-mode format, loaded into microprocessor memory at system startup, or stored within a programmable read only memory chip (PROM), erasable programmable read only memory chip (EPROM), or some other device capable of storing such digital information.

In general, the handshake sequence for use with the apparatus shown in FIGS. 3 or 4 may be summarized as follows. Both processors 12 and 14, in an initialized or idle data transmitting mode, would set their respective tri-state input/output ports 34 and 36 to a high impedance or input mode of operation for monitoring the logic level of a signal latched onto the handshake circuit coupling ports 34 and 36. In this initialization state, one or both of the processors 12 and 14 would place a handshake signal of a first predetermined logic level onto the self-latching handshake circuit indicating that the processor outputting the first logic level signal is ready to receive a subsequent data message via data bus 23.

Assume, for example, that processor 12 determines via its control software that it has a message to send to processor 14. At this point processor 12 would scan its port 34 to determine whether the logic level signal of the first predetermined level indicates that processor 14 is ready to receive a new data message. If the first predetermined logic level signal is present at port 34, processor 12 will then switch port 34 to a low impedance state for outputting a logic level signal of a second predetermined level to indicate that processor 12 can not receive subsequent data messages for the time being. Processor 12 would then place port 34 back into its high impedance or input monitoring state. Processor 12 then would send the data message to processor 14 via bus 23.

At this point processor 14 completes its data receipt of the message and places via port 36 in its low impedance state a handshake logic signal level of the first predetermined level onto the handshake circuit indicating that processor 14 is now ready to receive a subsequent data message. Processor 14 would then place its port 36 back to the input monitoring high impedance state.

At this point, both processors 12 and 14 are ready to send or receive a subsequent data message.

If upon checking for the first logic level handshake signal processor 12 would find the second logic level signal on the handshake circuit 30, then processor 12 would continue on to other tasks and recheck at a later time to see whether processor 14 is ready to receive a subsequent data message.

A more specific example of a routine for implementing a handshake sequence between two processors such as microprocessors 12 and 14 of FIGS. 3 or 4 is set forth in the flow chart of FIG. 5. With reference to FIG. 5, assume in the start state 50 both processors are idle and have their respective input/output ports set to the high impedance input monitoring state. At step 51, either processor wishing to send a next data message to the other processor reads the handshake circuit via its input/output port. At step 52, if the logic level appearing on the handshake circuit is of a first predetermined level, this indicates that no data is being sent from the other processor and that the processor performing the test may proceed to step 56.

At step 56 the processor determines whether it has a new data message to be put on bus 23 for receipt by the other processor. If the answer is no, the routine returns to step 51 of the flow chart. If the answer is yes, then the processor wishing to send the subsequent data message places its input/output port to the low impedance state for outputting a second logic level onto the handshake circuit. The processor then resets its input/output port to the high impedance condition. At step 58 the processor then sends the new data message to the other processor. At the completion of the data transmission at step 59 the transmitting processor reads via its input/output port the handshake signal logic level to determine whether the other processor has acknowledged at step 60 whether the data has been successfully received. This data received acknowledgement would be effected by placing the first predetermined logic level onto the handshake circuit. If the data has not been successfully received the routine returns to step 59 to re-read the handshake signal. If the data has been received, then the routine returns to step 51.

If, at step 52, the processor wishing to send a new data signal determines from the logic level on the handshake circuit that data is being sent by the other processor and therefore no new data can yet be sent, then at step 53 the processor checks to see if there is data ready to be unloaded from data bus 23. If there is no data to be taken off the bus, then the test 53 is reperformed. If the data is ready to be taken off the bus, then the data is read off the bus and placed in storage at step 54. At this point at step 55, the receiving processor resets the handshake signal via its input/output port and places a logic level of the first predetermined level back on to the handshake circuit via its input/output port. At this point the routine returns to step 51.

Although the invention has been described with particular reference to certain preferred embodiments thereof, variations and modifications can be effected within the spirit and scope of the following claims.

What is claimed is;

1. A handshake circuit for coordinating and regulating the exchange of data messages between a first and a second data processor, each having memory and control software associated therewith, the handshake circuit comprising:

a first input/output means within the first data processor for receiving signals and transmitting signals, the control software associated with the first data processor configuring the first input/output means in one of a signal receiving mode and a signal transmitting mode;

a second input/output means within the second data processor for receiving signals and transmitting signals, the control software associated with the second data processor configuring the second input/output means in one of a signal receiving mode and a signal transmitting mode; and self-latching circuit means connecting the first and the second input/output means for storing signals transmitted between the first data processor and the second data processor, wherein the first input/output means, the second input/output means and the self-latching circuit means are operable for bidirectionally regulating data transfer between the first data processor and the second data processor.

2. The handshake circuit of claim 1 wherein the first and second input/output means comprises tri-state input/output port means.

3. The handshake circuit of claim 1 wherein the self-latching circuit means comprises:
a first branch connected between the first and second input/output means including a first amplifier connected in series with a first resistor so as to allow signals to be transmitted in only one direction; and
a second branch connected in parallel with the first branch and including a second amplifier connected in series with a second resistor so as to allow signals to be transmitted in a direction opposite to the one direction.

4. The handshake circuit of claim 1 wherein the self-latching circuit means comprises:
a first branch connected between the first and second input/output means including a first invertor connected in series with a first resistor so as to allow signals to be transmitted in only one direction; and
a second branch connected in parallel with the first branch and including a second invertor connected in series with a second resistor so as to allow signals to be transmitted in a direction opposite to the one direction.

5. The handshake circuit of claim 2 wherein the self-latching circuit means comprises:
a first branch connected between the first and second input/output means including a first amplifier connected in series with a first resistor so as to allow signals to be transmitted in only one direction; and
a second branch connected in parallel with the first branch and including a second amplifier connected in series with a second resistor so as to allow signals to be transmitted in a direction opposite to the one direction.

6. A handshake circuit of claim 2 wherein the self-latching circuit means comprises:
a first branch connected between the first and second input/output means including a first invertor connected in series with a first resistor so as to allow signals to be transmitted in only one direction; and
a second branch connected in parallel with the first branch and including a second invertor connected in series with a second resistor so as to allow signals to be transmitted in a direction opposite to the one direction.

7. In a communication system for the transmission of data between a first and a second processor via a data bus, each processor having memory and control software, a method for coordinating and regulating the exchange of data between the first and the second processors comprising:

(a) providing a first tri-state input/output port at the first processor; a second tri-state input/output port at the second processor and a self-latching handshake circuit interconnecting the first and the second tri-state input/output ports, wherein the first tri-state input/output port, the second tri-state input/output port and the self-latching handshake circuit are operable for bidirectionally regulating data transfer between the first processor and the second processor;

(b) initialing both processors, via their respective control software, to place their respective tri-state input/output ports in a high impedance state enabling either processor to monitor a signal latched to the handshake circuit;

(c) causing either one of the processors, via its respective control software, to set its respective tri-state input/output port to a low impedance level for outputting a handshake signal of a first logic level onto the handshake circuit whenever the one processor is ready to receive data on the data bus and thereafter returning the respective tri-state input/output port to a high impedance level; and (d) causing either one of the processors, via its respective control software, to set its respective tri-state input/output port to a low impedance level for outputting a handshake signal of a second logic level onto the handshake circuit whenever the one processor is not ready to receive data on the data bus and thereafter returning the respective tri-state input/output port to a high impedance level.

* * * * *